A. MUSHAWAY.
AUTOMOBILE SECURITY LOCK DEVICE.
APPLICATION FILED DEC. 18, 1916.
1,250,207.
Patented Dec. 18, 1917.
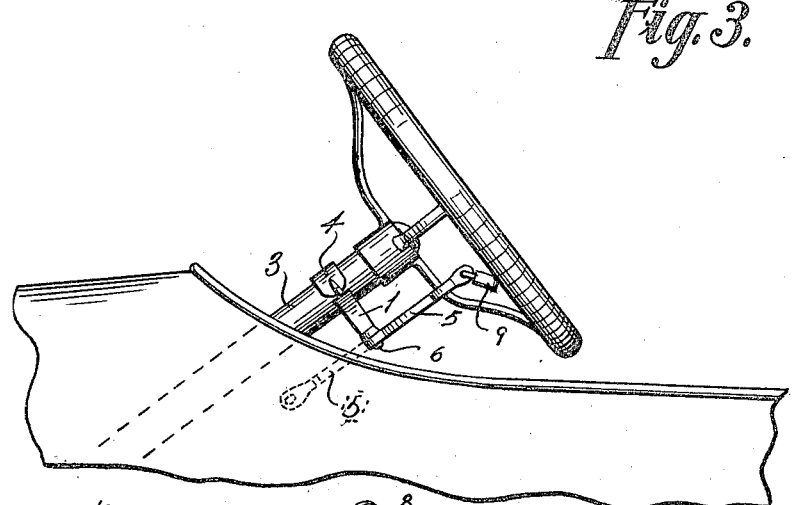
Fig. 3.
Fig. 1.
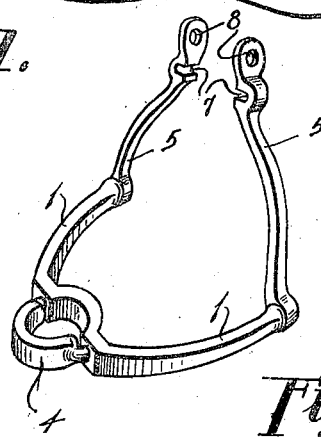
Fig. 2.
INVENTOR.
Alden Mushaway
BY
ATTORNEY.

UNITED STATES PATENT OFFICE.

ALDEN MUSHAWAY, OF DALLAS, TEXAS.

AUTOMOBILE-SECURITY-LOCK DEVICE.

1,250,207.  Specification of Letters Patent.  Patented Dec. 18, 1917.

Application filed December 18, 1916. Serial No. 137,554.

*To all whom it may concern:*

Be it known that I, ALDEN MUSHAWAY, of the city of Dallas, county of Dallas, State of Texas, United States of America, have invented new and useful Improvements in Automobile-Security-Lock Devices, of which the following is a specification.

This invention relates and appertains to a certain new and useful form of automobile lock, adaptable for use in connection with the steering column and steering wheel of the car or automobile to be locked.

A purpose of the invention is to provide such a form of lock device as will be accessibly located upon the car, making it convenient for use to the driver of the automobile. With this in view the invention provides a certain substantially heavy and strong yoke with locking arms pivotally attached to said yoke for locking the steering wheel in any position desired. The invention especially provides locking arms for attachment to and the locking of the steering wheel from the spoke thereof, rendering impossible the manipulation of said steering wheel of the car, thus securing the car against use or theft by improper users.

With the above and other objects in view the invention has relation to a certain combination and arrangement of parts, a description of which is given in the following specification pointed out in the appended claim and illustrated in the accompanying drawings, wherein:

Figure 1 illustrates in side elevation the steering wheel of an automobile shown projecting above the body of the car, with only a portion of said body illustrated for comprehension of parts.

Fig. 2 illustrates in perspective view the lock device comprising this invention.

Fig. 3 illustrates in detail a view partly in section.

Referring now more in particular to the several views of the drawing, wherein the same parts are designated by identical reference numerals, the numeral 1 designates the two extended arms of a yoke comprising the base upon which the other parts as herein described are mounted. The yoke member 1 is formed with such a shape as illustrated in Fig. 2 as will adapt said member to be mounted upon the steering column 3 of the automobile. A substantially heavy strap 4 is applied to the steering column and has a fixed connection with the yoke member 1 by having each extremity of said member 4 passed through holes formed in member 1, and securely bradded or welded thereto. This securely fixes and locks member 1 to the steering column. A pair of arms 5, substantially heavy and strong in form, are pivotally carried upon the extremity of each yoke member 1, by being pivotally confined upon a substantially large and heavy brad 6, which securely fixes in a pivotal relation said member 5 to the member 1. The upper extremities of the arm members 5 are provided with an open receiving slot, as indicated by the numeral 7. The design, shape and form of the slot 7, as formed in the two extremities of the member 5, are adapted to register one with the other when said members are drawn together, and further designed in form and size to accommodate and receive the spoke of the automobile steering wheel. An aperture or hole, as indicated by the numeral 8, is provided just above the slot 7 adapted to receive the loop of lock as shown in Fig. 1, and which lock is designated by the numeral 9 therein. When the car is not in use and it is desired to lock same with this device the arms 5 are brought into position as shown in Fig. 1, and locked. This effectually secures the automobile against tampering users. When not in use the arms 5 are unlocked from the spokes of the wheel and allowed to drop down out of engagement of the wheel and assume a normal position, as indicated by dotted lines in Fig. 1. Fig. 3 indicates the manner of attaching the strap member 4 to the body or yoke of the lock device, and indicates a substantially heavy brad or rivet 10, integrally formed upon the strap 4, and passed through the body of the yoke and bradded down as shown. This form of construction is used in pivotally connecting the lock arms 5 to the yoke as well as the strap 4 to said yoke.

This invention is presented to include all such changes and modifications as may properly come within the scope of the following claim:

In an automobile lock device, the combination with the steering post of an automobile, of a yoke member fixed to the steering post in a substantial manner, said yoke provided with outwardly extending arms, an arm provided with a slot for receiving the spoke of the steering wheel pivoted upon each outer extremity of each extended arm and adapted to converge and join at the spoke of the wheel thus giving a bracing effect to resist the turn in either direction of the wheel, and a locking means provided for receiving some form of convenient lock to secure the two converging arms together.

In testimony whereof I hereunto affix my hand.

ALDEN MUSHAWAY.

Witnesses:
   J. C. LEDBETTER,
   CLARENCE CARPENTER.